(12) United States Patent
Bhatia et al.

(10) Patent No.: US 12,210,979 B2
(45) Date of Patent: Jan. 28, 2025

(54) METHOD AND APPARATUS FOR IMPLEMENTING A CUSTOMIZABLE RULES ENGINE MODULE

(71) Applicant: JPMorgan Chase Bank, N.A., New York, NY (US)

(72) Inventors: Saurab Bhatia, Katy, TX (US); George Cole, Bournemouth (GB)

(73) Assignee: JPMORGAN CHASE BANK, N.A., New York, NY (US)

( * ) Notice: Subject to any disclaimer, the term of this patent is extended or adjusted under 35 U.S.C. 154(b) by 1011 days.

(21) Appl. No.: 17/183,881

(22) Filed: Feb. 24, 2021

(65) Prior Publication Data

US 2021/0264293 A1    Aug. 26, 2021

Related U.S. Application Data

(60) Provisional application No. 62/981,279, filed on Feb. 25, 2020.

(51) Int. Cl.
   *G06N 5/02* (2023.01)
   *G06F 16/23* (2019.01)
   *G06F 16/2457* (2019.01)

(52) U.S. Cl.
   CPC ......... *G06N 5/027* (2013.01); *G06F 16/2379* (2019.01); *G06F 16/24578* (2019.01)

(58) Field of Classification Search
   CPC ............... G06N 5/027; G06F 16/2379; G06F 16/24578

USPC ........................................................ 707/758
See application file for complete search history.

(56) References Cited

U.S. PATENT DOCUMENTS

| | | | |
|---|---|---|---|
| 2015/0154713 A1* | 6/2015 | Diaz | G06Q 40/08 705/4 |
| 2016/0117628 A1* | 4/2016 | Brophy | G06Q 10/063112 704/2 |
| 2016/0171404 A1* | 6/2016 | Mukherjee | G06Q 10/06313 705/7.14 |
| 2020/0005243 A1* | 1/2020 | Pong | G06Q 10/0633 |
| 2021/0374562 A1* | 12/2021 | Chang | G06N 20/00 |

* cited by examiner

*Primary Examiner* — Hosain T Alam
*Assistant Examiner* — Saba Ahmed
(74) *Attorney, Agent, or Firm* — GREENBLUM & BERNSTEIN, P.L.C.

(57) ABSTRACT

Various methods, apparatuses, and media for implementing a customizable rules engine module are provided. A database stores data related to skill set of each user and data related to availability information of each user. A receiver receives data associated with each of a plurality of work items. A processor dynamically allocates, from the received data, both a score value to assign a priority to each work item and a bit-mapped skill value for each work item regardless of the source system from which each work item is being received or work type of each work item. The processor queries the database to identify a user having availability data and associated skill set data that matches with the score value and the bit-mapped skill value for each work item and automatically assigns the work item to the user.

20 Claims, 5 Drawing Sheets

METHOD AND APPARATUS FOR IMPLEMENTING A CUSTOMIZABLE RULES ENGINE MODULE

CROSS-REFERENCE TO RELATED APPLICATIONS

This application claims the benefit of priority from U.S. Provisional Patent Application No. 62/981,279, filed Feb. 25, 2020, which is herein incorporated by reference in its entirety.

TECHNICAL FIELD

This disclosure generally relates to data processing, and, more particularly, to methods and apparatuses for implementing a customizable rules engine module for dynamically and automatically allocating both a score and a bit-mapped skill value for every received work item regardless of source system or work type thereby significantly reducing processing and resolution time of work item.

BACKGROUND

In many enterprise settings, teams of people are responsible for performing work items (e.g., tickets, requests, tasks, etc.) which are allocated to their group in multiple systems. Because of large volumes of work items may be assigned to their group, these people may often face with difficulties to determine what work items to work on or in which order to work on these work items. Moreover, individuals within these teams may not have the required skillset or access to action requests which they often do not realize until picking up the item, thereby delaying resolution. With very large enterprises, with very large amount of received work items, this may become unwieldy very quickly.

SUMMARY

The present disclosure, through one or more of its various aspects, embodiments, and/or specific features or sub-components, provides, among others, various systems, servers, devices, methods, media, programs, and platforms for implementing a customizable rules engine module for dynamically and automatically allocating both a score and a bit-mapped skill value for every received work item regardless of source system or work type thereby significantly reducing processing and resolution time of work item, but the disclosure is not limited thereto. The various aspects, embodiments, features, and/or sub-components may provide optimized processes of implementing a customizable rules engine module that may allow automatically creating rules for varying attributes found in various source systems (e.g., an alert identification or a region of the requesting user), and for each rule, aligning a score (which may result in it being prioritized higher) or a skill set (which a person may be allocated in order to work that item), but the disclosure is not limited thereto. The various aspects, embodiments, features, and/or sub-components may also provide optimized processes of implementing a customizable rules engine module that may allow, for each work item (e.g., ticket, request, task, etc.), automatically rescoring whenever updated, and at periodic intervals, to ensure that the priority is always accurate, but the disclosure is not limited thereto. The various aspects, embodiments, features, and/or sub-components may additionally provide optimized processes of implementing a customizable rules engine module that may allow utilizing a bit-mapping approach for skill sets allowing multiple rule matches to dictate an engineer should possess skill set X, Y and/or Z, etc. in order to take and work on the work item, but the disclosure is not limited thereto. The various aspects, embodiments, features, and/or sub-components may also provide optimized processes of implementing a customizable rules engine module that may allow utilizing the output from the customizable rules engine module to automatically and dynamically assign work items to the most appropriate user (e.g., an engineer) at any time based on the user's availability and skill set.

According to an aspect of the present disclosure, a method for implementing a customizable rules engine module for automatically assigning a work item to a user computing device based on a skill set and an availability of a user is disclsoed. The method may include: providing a database that stores skill set data related to a skill set of one or more users received from one or more administrator computing devices and availability data related to an availability information of said one or more users received from one or more scheduling systems; receiving, by a receiver, data associated with each of a plurality of work items received from one or more source systems (client devices) via one or more communication networks; dynamically allocating, by a processor, from the received data, both a score value to assign a priority to each work item and a bit mapped skill value for each work item regardless of the source system from which each work item is being received or work type of each work item; querying the database, by the processor, to identify one or more users having availability data and associated skill set data correlated with the score value associated with the assigned priority for each work item and the bit mapped skill value for each work item; and automatically assigning, by the processor, a work item to a user computing device utilized by a user based on identifying that the user's skill set data matches the score value associated with the assigned priority for the work item and the bit mapped skill value for the work item, and that the user's availability data matches the availability information received from the database via the one or more communication networks.

According to another aspect of the present disclosure, the method may further include: creating rules, by the processor, for varying attributes found in the one or more source systems; for each rule, automatically aligning, by the processor, a score value that matches the assigned priority to each work item; and automatically assigning, by the processor, each work item to the user computing device based on the aligned score value.

According to yet another aspect of the present disclosure, the method may further include: creating rules, by the processor, for varying attributes found in the one or more source systems; for each rule, automatically aligning, by the processor, a skill set of user (e.g., an engineer who is responsible to resolve the work item) that matches the bit mapped skill value for each work item; and automatically assigning, by the processor, each work item to the user computing device based on the aligned skill set.

According to a further aspect of the present disclosure, the method may further include: dynamically and automatically updating, by the processor, the database when new skill set data and new availability data are received from the one or more administrator computing devices to ensure accuracy of skill set data and availability data.

According to another aspect of the present disclosure, the method may further include: automatically sending, by the processor, an electronic notification to both the user computing device and the one or more administrator computing devices, different from the user's computing device, after assigning the work item to the user computing device.

According to yet another aspect of the present disclosure, the method may further include: storing, by the processor, the score value associated with the assigned priority for each work item and the bit-mapped skill value for each work item onto the database; automatically sending, by the processor, an electronic notification from the user computing device to both the database and the one or more administrator computing devices when the work item is completed; dynamically and automatically updating, by the processor, the database by removing the completed work item from a que of work items; and automatically rescoring, by the processor, the remaining work items to assign new priorities to each remaining work item.

According to an additional aspect of the present disclosure, the method may further include: storing, by the processor, the score value associated with the assigned priority for each work item and the bit-mapped skill value for each work item onto the database; automatically rescoring, by the processor, each work item when new work items are received from the one or more source systems; and dynamically and automatically updating, by the processor, the database based on the rescored work items to ensure accuracy of priorities.

According to yet another aspect of the present disclosure, a system for implementing a customizable rules engine module for automatically assigning a work item to a user computing device based on a skill set and an availability of a user is disclosed. The system may include a database that stores skill set data related to a skill set of one or more users received from one or more administrator computing devices and availability data related to an availability information of said one or more users received from one or more scheduling systems; a receiver that receives data associated with each of a plurality of work items received from one or more source systems (client devices) via one or more communication networks; and a processor operatively connected to the database and the receiver via the one or more communication networks. The processor may be configured to: dynamically allocate, from the received data, both a score value to assign a priority to each work item and a bit-mapped skill value for each work item regardless of the source system from which each work item is being received or work type of each work item; query the database to identify one or more users having availability data and associated skill set data correlated with the score value associated with the assigned priority for each work item and the bit-mapped skill value for each work item; and automatically assign a work item to a user computing device utilized by a user based on identifying that the user's skill set data matches the score value associated with the assigned priority for the work item and the bit-mapped skill value for the work item, and that the user's availability data matches the availability information received from the database via the one or more communication networks.

According to an additional aspect of the present disclosure, the processor may be further configured to: create rules for varying attributes found in the one or more source systems; for each rule, automatically align a score value that matches the assigned priority to each work item; and automatically assign each work item to the user computing device based on the aligned score value.

According to a further aspect of the present disclosure, the processor may be further configured to: create rules for varying attributes found in the one or more source systems; for each rule, automatically align, by the processor, a skill set of a user that matches the bit-mapped skill value for each work item; and automatically assign each work item to the user computing device based on the aligned skill set.

According to yet another aspect of the present disclosure, the processor may be further configured to: dynamically and automatically update the database when new skill set data and new availability data are received from the one or more administrator computing devices to ensure accuracy of skill set data and availability data.

According to an aspect of the present disclosure, the processor may be further configured to: automatically send an electronic notification to both the user computing device and the one or more administrator computing devices, different from the user's computing device, after assigning the work item to the user computing device.

According to another aspect of the present disclosure, the processor may be further configured to: store the score value associated with the assigned priority for each work item and the bit-mapped skill value for each work item onto the database; automatically send, by the processor, an electronic notification from the user computing device to both the database and the one or more administrator computing devices when the work item is completed; dynamically and automatically update the database by removing the completed work item from a que of work items; and automatically rescore the remaining work items to assign new priorities to each remaining work item.

According to yet another aspect of the present disclosure, the processor may be further configured to: store the score value associated with the assigned priority for each work item and the bit-mapped skill value for each work item onto the database; automatically rescore each work item when new work items are received from the one or more source systems; and dynamically and automatically update the database based on the rescored work items to ensure accuracy of priorities.

According to yet another aspect of the present disclosure, a non-transitory computer readable medium configured to store instructions for implementing a customizable rules engine module for automatically assigning a work item to a user computing device based on a skill set and an availability of a user is disclosed. The instructions, when executed, may cause a processor to perform the following: configuring a database to store skill set data related to a skill set of one or more users received from one or more administrator computing devices and availability data related to an availability information of said one or more users received from one or more scheduling systems; causing a receiving to receive data associated with each of a plurality of work items received from one or more source systems (client devices) via one or more communication networks; dynamically allocating, from the received data, both a score value to assign a priority to each work item and a bit-mapped skill value for each work item regardless of the source system from which each work item is being received or work type of each work item; querying the database, to identify one or more users having availability data and associated skill set data correlated with the score value associated with the assigned priority for each work item and the bit-mapped skill value for each work item; and automatically assigning, a work item to a user computing device utilized by a user based on identifying that the user's skill set data matches the score value associated with the assigned priority for the work item and the bit-mapped skill value for the work item, and that the user's availability data matches the availability information received from the database via the one or more communication networks.

According to another aspect of the present disclosure, the instructions, when executed, may further cause the processor to perform the following: creating rules for varying attributes found in the one or more source systems; for each rule, automatically aligning a score value that matches the assigned priority to each work item; and automatically assigning each work item to the user computing device based on the aligned score value.

According to yet another aspect of the present disclosure, the instructions, when executed, may further cause the processor to perform the following: creating rules for varying attributes found in the one or more source systems; for each rule, automatically aligning a skill set of user (e.g., an engineer who is responsible to resolve the work item) that matches the bit mapped skill value for each work item; and automatically assigning each work item to the user computing device based on the aligned skill set.

According to a further aspect of the present disclosure, the instructions, when executed, may further cause the processor to perform the following: dynamically and automatically updating the database when new skill set data and new availability data are received from the one or more administrator computing devices to ensure accuracy of skill set data and availability data.

According to another aspect of the present disclosure, the instructions, when executed, may further cause the processor to perform the following: automatically sending an electronic notification to both the user computing device and the one or more administrator computing devices, different from the user's computing device, after assigning the work item to the user computing device.

According to yet another aspect of the present disclosure, the instructions, when executed, may further cause the processor to perform the following: storing the score value associated with the assigned priority for each work item and the bit-mapped skill value for each work item onto the database; automatically sending an electronic notification from the user computing device to both the database and the one or more administrator computing devices when the work item is completed; dynamically and automatically updating the database by removing the completed work item from a que of work items; and automatically rescoring the remaining work items to assign new priorities to each remaining work item.

According to an additional aspect of the present disclosure, the instructions, when executed, may further cause the processor to perform the following: storing the score value associated with the assigned priority for each work item and the bit-mapped skill value for each work item onto the database; automatically rescoring each work item when new work items are received from the one or more source systems; and dynamically and automatically updating the database based on the rescored work items to ensure accuracy of priorities.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure, are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

As is traditional in the field of the present disclosure, example embodiments are described, and illustrated in the drawings, in terms of functional blocks, units and/or modules. Those skilled in the art will appreciate that these blocks, units and/or modules are physically implemented by electronic (or optical) circuits such as logic circuits, discrete components, microprocessors, hard-wired circuits, memory elements, wiring connections, and the like, which may be formed using semiconductor-based fabrication techniques or other manufacturing technologies. In the case of the blocks, units and/or modules being implemented by microprocessors or similar, they may be programmed using software (e.g., microcode) to perform various functions discussed herein and may optionally be driven by firmware and/or software. Alternatively, each block, unit and/or module may be implemented by dedicated hardware, or as a combination of dedicated hardware to perform some functions and a processor (e.g., one or more programmed microprocessors and associated circuitry) to perform other functions. Also, each block, unit and/or module of the example embodiments may be physically separated into two or more interacting and discrete blocks, units and/or modules without departing from the scope of the inventive concepts. Further, the blocks, units and/or modules of the example embodiments may be physically combined into more complex blocks, units and/or modules without departing from the scope of the present disclosure.

Terms such as "substantially," "about," or "approximately" may reflect amounts, sizes, orientations, or layouts that vary only in a small relative manner, and/or in a way that does not significantly alter the operation, functionality, or structure of certain elements. For example, a range from "about 0.1 to about 1" may encompass a range such as a 0%-5% deviation around 0.1 and a 0% to 5% deviation around 1, especially if such deviation maintains the same effect as the listed range.

Figure 1:
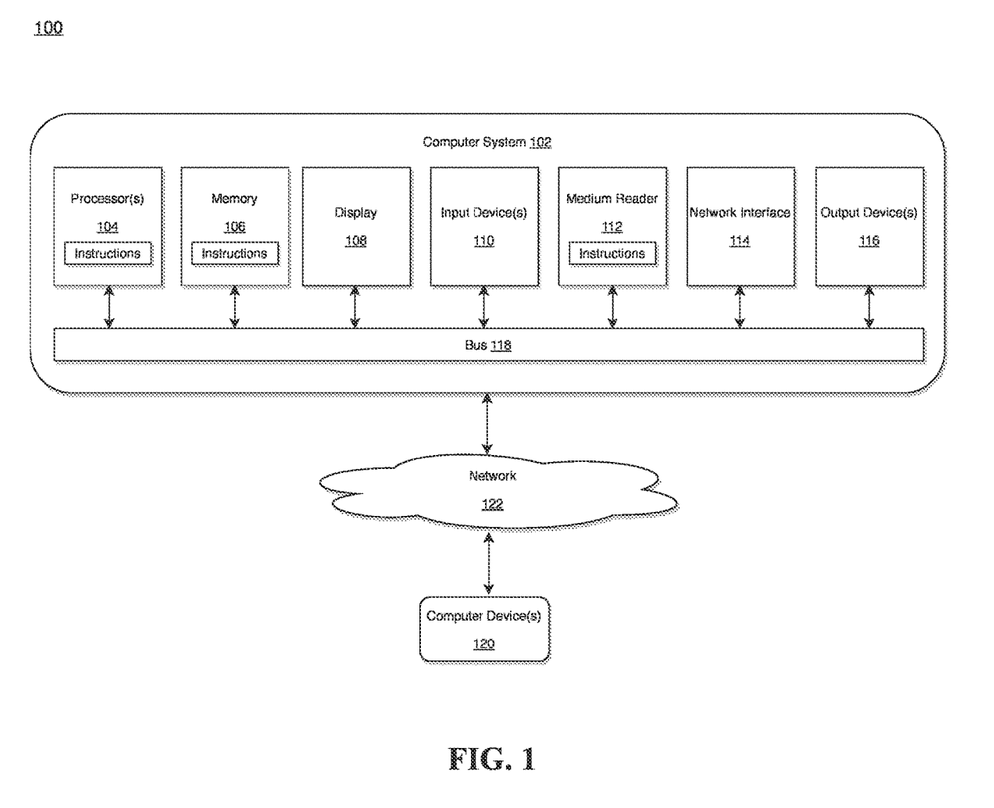
FIG. 1 illustrates a computer system for implementing a customizable rules engine module in accordance with an exemplary embodiment.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a video display 108, such as a liquid crystal display (LCD), an organic light emitting diode (OLED), a flat panel display, a solid state display, a cathode ray tube (CRT), a plasma display, or any other known display.

The computer system 102 may also include at least one input device 110, such as a keyboard, a touch-sensitive input screen or pad, a speech input, a mouse, a remote control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software or any combination thereof which are commonly known and understood as being included with or within a computer system, such as, but not limited to, a network interface 114 and an output device 116. The output device 116 may be, but is not limited to, a speaker, an audio out, a video out, a remote control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionality as described herein, and a processor described herein may be used to support a virtual processing environment.

As described herein, various embodiments provide optimized processes for implementing a customizable rules engine module for dynamically and automatically allocating both a score and a bit-mapped skill value for every received work item regardless of source system or work type thereby significantly reducing processing and resolution time of work item, but the disclosure is not limited thereto.

Figure 2:
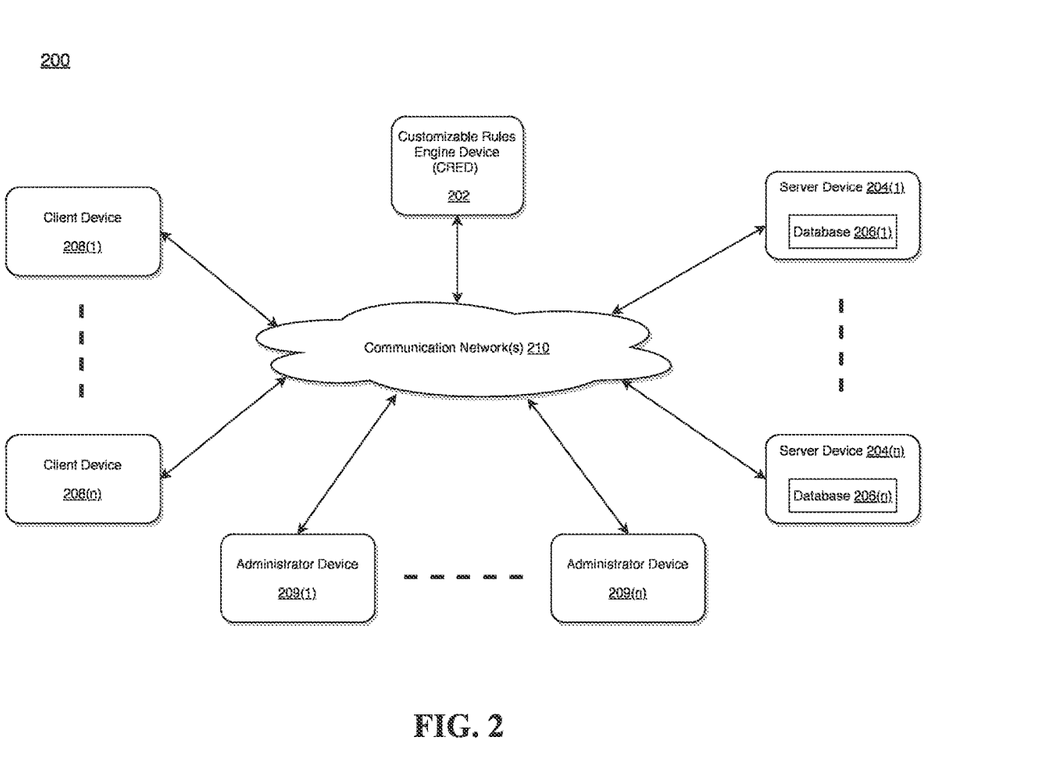
FIG. 2 illustrates an exemplary diagram of a network environment with a customizable rules engine device in accordance with an exemplary embodiment.

Referring to FIG. 2, a schematic of an exemplary network environment 200 for optimized processes of implementing a customizable rules engine device is described herein in accordance with exemplary embodiments.

According to exemplary embodiments, significant reduction of processing time to process and resolve work items (e.g., tickets, tasks, requests etc.) may be facilitated by implementing a customizable rules engine device (CRED) 202 as illustrated in FIG. 2. The CRED 202 may be the same or similar to the computer system 102 as described with respect to FIG. 1. The CRED 202 may store one or more applications that can include executable instructions that, when executed by the CRED 202, cause the CRED 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the CRED 202 itself, may be located in virtual server(s) running in a cloud-based computing environment rather than being tied to one or more specific physical network computing devices. Also, the application(s) may be running in one or more virtual machines (VMs) executing on the CRED 202. Additionally, in one or more embodiments of this technology, virtual machine(s) running on the CRED 202 may be managed or supervised by a hypervisor.

In the network environment 200 of FIG. 2, the CRED 202 is coupled to a plurality of server devices 204(1)-204(n) that hosts a plurality of databases 206(1)-206(n), and also to a plurality of client devices 208(1)-208(n) and a plurality of administrator devices 209(1)-209(n) via communication network(s) 210. A communication interface of the CRED 202, such as the network interface 114 of the computer system 102 of FIG. 1, operatively couples and communicates between the CRED 202, the server devices 204(1)-204(n), and/or the client devices 208(1)-208(n), and/or the administrator devices 209(1)-209(n), which are all coupled together by the communication network(s) 210, but the disclosure is not limited thereto. For example, other types and/or numbers of communication networks or systems with other types and/or numbers of connections and/or configurations to other devices and/or elements may also be used.

The communication network(s) 210 may be the same or similar to the network 122 as described with respect to FIG. 1, although the CRED 202, the server devices 204(1)-204(n), and/or the client devices 208(1)-208(n), and/or the administrator devices 209(1)-209(n), may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and CRED s that efficiently combine multiple client side to server connections from the same browser into a single connection per browser to improve network communication and reduce power consumption.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The CRED 202 may be a standalone device or integrated with one or more other devices or apparatuses, such as one or more of the server devices 204(1)-204(n), for example. In one particular example, the CRED 202 may include or be hosted by one of the server devices 204(1)-204(n), and other arrangements are also possible. Moreover, one or more of the devices of the CRED 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the CRED 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store metadata sets, data quality rules, and newly generated data.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a master/slave approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) and the plurality of administrator devices 209(1)-209(n), may also be the same or similar to the computer system 102 or the computer device 120 as described with respect to FIG. 1, including any features or combination of features described with respect thereto. Client device in this context refers to any computing device that interfaces to communications network(s) 210 to obtain resources from one or more server devices 204(1)-204(n) or other client devices 208(1)-208(n).

According to exemplary embodiments, the client devices 208(1)-208(n) and the administrator devices 209(1)-209(n), in this example may include any type of computing device that can facilitate the implementation of the CRED 202 that may efficiently optimize processes for significantly reducing processing and resolution time of work items by dynamically and automatically allocating both a score and a bit-mapped skill value for every received work item regardless of source system. The client devices 208(1)-208(n) and the administrator devices 209(1)-209(n) may be mobile computing devices, desktop computing devices, laptop computing devices, tablet computing devices, virtual machines (including cloud-based computers), or the like, that may execute host chat operation, e-mail operation, or voice-to-text applications, for example.

The client devices 208(1)-208(n) and the administrator devices 209(1)-209(n) may run interface applications, such as standard web browsers or standalone client applications, which may provide an interface to communicate with the CRED 202 via the communication network(s) 210 in order to communicate user requests. The client devices 208(1)-208(n) and the administrator devices 209(1)-209(n) may further include, among other features, a display device, such as a display screen or touchscreen, and/or an input device, such as a keyboard, for example.

Although the exemplary network environment 200 with the CRED 202, the server devices 204(1)-204(n), the client devices 208(1)-208(n), the administrator devices 209(1)-209(n) and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the CRED 202, the server devices 204(1)-204(n), or the client devices 208(1)-208(n), or the administrator devices 209(1)-209(n) for example, may be configured to operate as virtual instances on the same physical machine. For example, one or more of the CRED 202, the server devices 204(1)-204(n), or the client devices 208(1)-208(n), or the administrator devices 209(1)-209(n) may operate on the same physical device rather than as separate devices communicating through communication network(s) 210. Additionally, there may be more or fewer CREDs 202, server devices 204(1)-204(n), client devices 208(1)-208(n), or administrator devices 209(1)-209(n) than illustrated in FIG. 2.

In addition, two or more computing systems or devices may be substituted for any one of the systems or devices in any example. Accordingly, principles and advantages of distributed processing, such as redundancy and replication also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
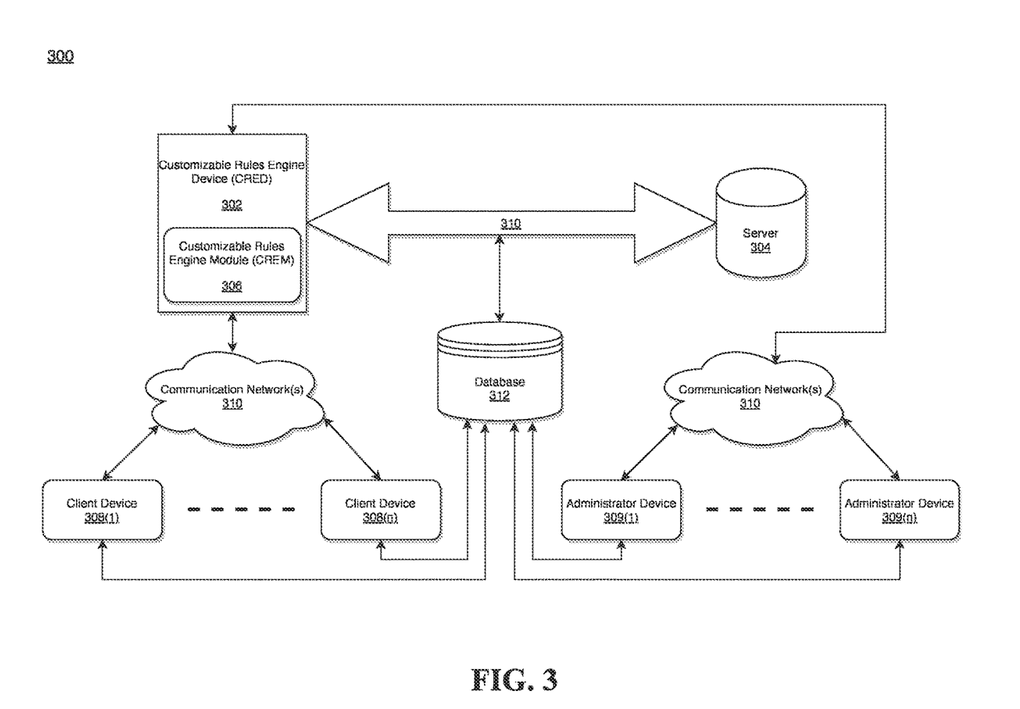
FIG. 3 illustrates an exemplary block diagram of a system with a customizable rules engine device having a customizable rules engine module in accordance with an exemplary embodiment.

FIG. 3 illustrates a system 300 diagram for implementing a CRED with a customizable rules engine module (CREM) in accordance with an exemplary embodiment.

As illustrated in FIG. 3, according to exemplary embodiments, the CRED 302 including the CREM 306 may be connected to a server 304 and a database 312 via a communication network 310, but the disclosure is not limited thereto. For example, according to exemplary embodiments, the CREM 306 may be connected to any desired database besides the database 312. The CRED 302 may also be connected to a plurality of client device 308(1)-308(n) and a plurality of administrator devices 309(1)-309(n) via the communication network 310, but the disclosure is not limited thereto.

According to exemplary embodiment, the CRED 302 is described and shown in FIG. 3 as including the CREM 306, although it may include other rules, policies, modules, databases, or applications, for example. According to exemplary embodiments, the database 312 may be embedded within the CRED 302. According to exemplary embodiments, the server 304 may also be a database which may be configured to store information including a plurality of work items data, but the disclosure is not limited thereto.

According to exemplary embodiments, the CREM 306 may be configured to receive continuous feed of data from the server 304 and the database via the communication network 310.

As will be described below, the CREM 306 may be configured to access a database 312 that stores data related to skill set of each user received from one or more administrator computing devices 309(1)-309(n) and data related to availability information of each user received from one or more scheduling systems (not shown); receive data associated with each of a plurality of work items received from one or more source systems, e.g., client devices 308(1)-308(n) via one or more communication networks 310; dynamically allocate, from the received data, both a score value to assign a priority to each work item and a bit-mapped skill value for each work item regardless of the source system from which each work item is being received or work type of each work item; query the database to identify one or more users having availability data and associated skill set data correlated with the score value associated with the assigned priority for each work item and the bit-mapped skill value for each work item; and automatically assign a work item to a user computing device (e.g., one or more CREDs) utilized by a user based on identifying that the user's skill set data matches the score value associated with the assigned priority for the work item and the bit-mapped skill value for the work item, and that the user's availability data matches the availability information received from the database 312 via the one or more communication networks 310.

According to exemplary embodiments, the user may be an engineer or a person who may be responsible to resolve the work items requested by a client. Accordance with other exemplary embodiments, a user may also be an application that can resolve the work items requested by a client.

The client devices 308(1)-308(n) are illustrated as being in communication with the CRED 302. In this regard, the client devices 308(1)-308(n) may be "clients" of the CRED 302 and are described herein as such. Nevertheless, it is to be known and understood that the client devices 308(1)-308(n) need not necessarily be "clients" of the CRED 302, or any entity described in association therewith herein. Any additional or alternative relationship may exist between either or both of the client devices 308(1)-308(n) and the CRED 302, or no relationship may exist.

The administrator devices 309(1)-309(n) are illustrated as being in communication with the CRED 302. In this regard, the administrator devices 309(1)-309(n) may be "administrators" (who may be responsible to enter and/or update skill set data of their employees (e.g., engineers or other user)) of the CRED 302 and are described herein as such. Nevertheless, it is to be known and understood that the administrator devices 309(1)-309(n) need not necessarily be "administrators" of the CRED 302, or any entity described in association therewith herein. Any additional or alternative relationship may exist between either or both of the administrator devices 309(1)-309(n) and the CRED 302, or no relationship may exist.

The first client device 308(1) may be, for example, a smart phone. Of course, the first client device 308(1) may be any additional device described herein. The second client device 308(n) may be, for example, a personal computer (PC). Of course, the second client device 308(n) may also be any additional device described herein. The first administrator device 309(1) may be, for example, a smart phone. Of course, the first administrator device 309(1) may be any additional device described herein. The second administrator device 309(n) may be, for example, a personal computer (PC). Of course, the second administrator device 309(n) may also be any additional device described herein. According to exemplary embodiments, the server 304 may be the same or equivalent to the server device 204 as illustrated in FIG. 2.

The process may be executed via the communication network 310, which may comprise plural networks as described above. For example, in an exemplary embodiment, either or both of the client devices 308(1)-308(n) and the administrator devices 309(1)-309(n) may communicate with the CRED 302 via broadband or cellular communication. Of course, these embodiments are merely exemplary and are not limiting or exhaustive.

Figure 4:
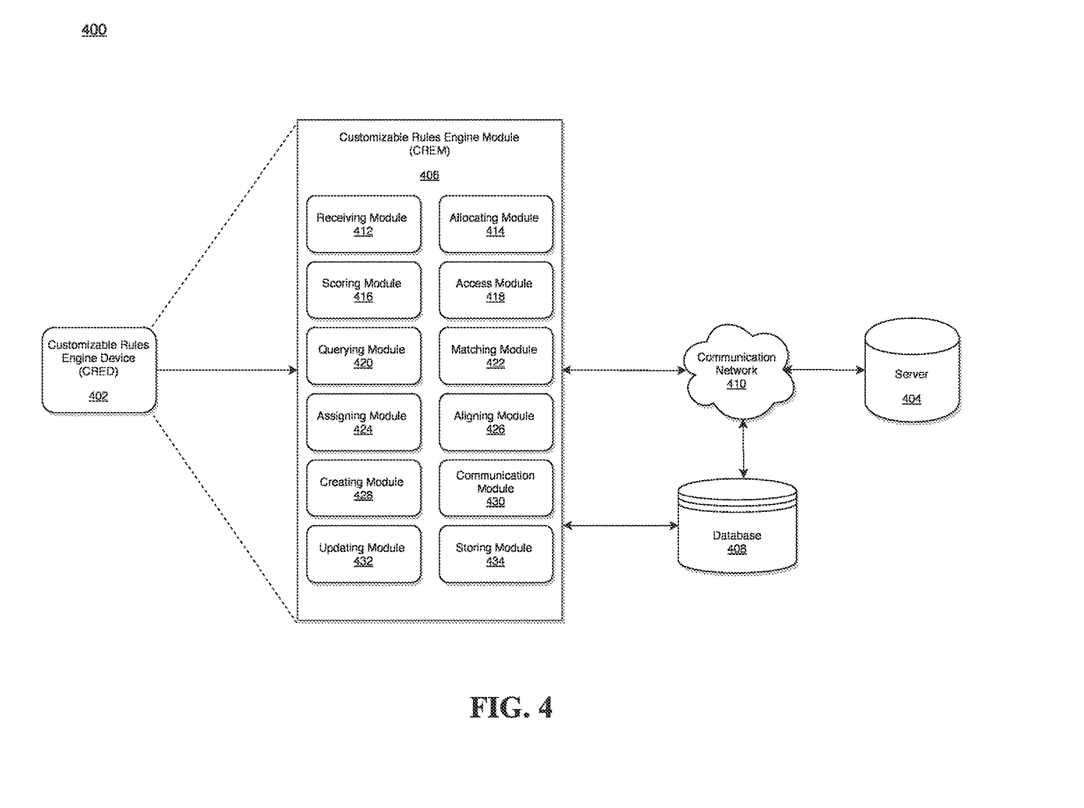
FIG. 4 illustrates an exemplary block diagram of a system with a customizable rules engine module in accordance with an exemplary embodiment.

FIG. 4 illustrates an exemplary block diagram of a system 400 with a customizable rules engine module in accordance with an exemplary embodiment.

As illustrated in FIG. 4, a CRED 401 having a CREM 406 may be coupled to one or more databases 408 and one or more servers 404 via a communication network 410. The CREM 406 may also be coupled to a plurality of client devices 308(1)-308(n) (not shown in FIG. 4, but shown in FIG. 3 for simplicity) and to a plurality of administrator devices 309(1)-309(n) (not shown in FIG. 4, but shown in FIG. 3 for simplicity). In the context of the instant disclosure, the CRED 401 may be utilized by a user (e.g., an engineer responsible for resolving the work items) or an application (service). The administrator devices 309(1)-309(n) may be utilized by a manager or a supervisor of the user, but the disclosure is not limited thereto. For example, in the context of the instant disclosure, the CRED 401 may also be utilized by a manager or a supervisor of the user. The communication network 410 may be the communication network 210 as disclosed herein with reference to FIG. 2 and/or the communication network 310 as disclosed herein with reference to FIG. 3.

According to exemplary embodiments, the CRED 401 and/or the administrator devices 309(1)-309(n) of the instant disclosure may be configured to implement a CREM 406 that may dynamically and automatically allocate both a score and a bit-mapped skill value for every received work item regardless of source system or work type thereby significantly reducing processing and resolution time of work item, but the disclosure is not limited thereto.

According to exemplary embodiments, the CRED 401 and/or the administrator devices 309(1)-309(n) of the instant disclosure may be configured to implement a CREM 406 that may allow automatically creating rules for varying attributes found in various source systems (e.g., an alert identification or a region of the requesting user) for each rule they can align a score (which may result in it being prioritized higher) or a skill set (which a person may be allocated in order to work that item), but the disclosure is not limited thereto.

According to exemplary embodiments, the CRED 401 and/or the administrator devices 309(1)-309(n) of the instant disclosure may be configured to implement a CREM 406 that may allow, for each work item (e.g., ticket, request, task, etc.), automatically rescoring whenever updated, and at periodic intervals, to ensure that the priority is always accurate, but the disclosure is not limited thereto.

According to exemplary embodiments, the CRED 401 and/or the administrator devices 309(1)-309(n) of the instant disclosure may be configured to implement a CREM 406 that may allow utilizing a bit-mapping approach for skill sets allowing multiple rule matches to dictate a user (e.g., an engineer) should possess skill set X, Y and/or Z, etc. in order to take and work on the work item, but the disclosure is not limited thereto.

According to exemplary embodiments, the CRED 401 and/or the administrator devices 309(1)-309(n) of the instant disclosure may be configured to implement a CREM 406 that may allow utilizing the output from the CREM 406 to automatically assign work items to the most appropriate user (e.g., an engineer) at any time based on the user's availability.

As illustrated in FIG. 4, according to exemplary embodiments, CREM 406 may include a receiving module 412, an allocating module 414, a scoring module 416, an access module 418, a querying module 420, a matching module 422, an assigning module 424, an aligning module 426, a creating module 428, a communication module 430, an updating module 432, and a storing module 434. According to exemplary embodiments, each of the receiving module 412, the allocating module 414, the scoring module 416, the access module 418, the querying module 420, the matching module 422, the assigning module 424, the aligning module 426, the creating module 428, the communication module 430, the updating module 432, and the storing module 434 may be implemented by microprocessors or similar, and may be programmed using software (e.g., microcode) to perform various functions discussed herein and may optionally be driven by firmware and/or software. Alternatively, each of the receiving module 412, the allocating module 414, the scoring module 416, the access module 418, the querying module 420, the matching module 422, the assigning module 424, the aligning module 426, the creating module 428, the communication module 430, the updating module 432, and the storing module 434 may be implemented by dedicated hardware, or as a combination of dedicated hardware to perform some functions and a processor (e.g., one or more programmed microprocessors and associated circuitry) to perform other functions.

According to exemplary embodiments, each of the receiving module 412, the allocating module 414, the scoring module 416, the access module 418, the querying module 420, the matching module 422, the assigning module 424, the aligning module 426, the creating module 428, the communication module 430, the updating module 432, and the storing module 434 may be physically separated into two or more interacting and discrete blocks, units and/or modules without departing from the scope of the inventive concepts. Further, according to exemplary embodiments, each of the receiving module 412, the allocating module 414, the scoring module 416, the access module 418, the querying module 420, the matching module 422, the assigning module 424, the aligning module 426, the creating module 428, the communication module 430, the updating module 432, and the storing module 434 may be physically combined into more complex blocks, units and/or modules without departing from the scope of the present disclosure.

According to exemplary embodiments, each of the receiving module 412, the allocating module 414, the scoring module 416, the access module 418, the querying module 420, the matching module 422, the assigning module 424, the aligning module 426, the creating module 428, the communication module 430, the updating module 432, and the storing module 434 of the CREM 406 may be called by corresponding API, but the disclosure is not limited thereto.

According to exemplary embodiments, the database 408 may store data related to skill set of each user received from one or more administrator computing devices (e.g., administrator devices 309(1)-309(n) as illustrated in FIG. 3) and data related to availability information of each user received from one or more scheduling systems (not shown). According to exemplary embodiments, the database 408 may store data related to skill set of each user received from the CRED 302. According to exemplary embodiments, the one or more scheduling systems may be any know scheduling system that is capable of transmitting scheduling information of a user. According to exemplary embodiments, scheduling information may include, but not limited thereto, a user's vacation plan, busy with other projects or work items until a certain time period, or out on sick leave or other leaves until a certain time period, etc.

According to exemplary embodiments, the receiving module 412 may be configured to receive data associated with each of a plurality of work items received from one or more source systems (e.g., one or more client devices 308(1)-308(n) as illustrated in FIG. 3) via one or more communication networks 410.

According to exemplary embodiments, the allocating module 414 may be configured to dynamically and automatically allocate, from the received data, both a score value to assign a priority to each work item and a bit mapped skill value for each work item regardless of the source system from which each work item is being received or work type of each work item. According to exemplary embodiments, the assigning module 424 may be configured to assign the priority to each work item and forward data related to the priority to the allocating module 414. According to exemplary embodiments, the scoring module 416 may be configured to insert a bit-mapped skill value for each work item and forward data related to the bit-mapped skill value to the allocating module 414. According to exemplary embodiments, the storing module 434 may be configured to store the data related to the assigned priority of each work item and the bit mapped skill value for each work item. The communication module 430 may be configured to send the data related to the assigned priority of each work item and the bit mapped skill value for each work item to the database 408 and/or the server 404 via the communication network 410.

According to exemplary embodiments, the querying module 420 may be configured to query the database 408 and/or the server 404 to identify one or more users having availability data and associated skill set data correlated with the score value associated with the assigned priority for each work item and the bit mapped skill value for each work item assigned by the assigning module 424.

According to exemplary embodiments, the assigning module 424 may be configured to automatically assign a work item to a user computing device utilized by a user based on identifying that the user's skill set data matches the score value associated with the assigned priority for the work item and the bit-mapped skill value for the work item, and that the user's availability data matches the availability information received from the database 408 and/or the server 404 via the one or more communication networks 410 and the communication module 430. According to exemplary embodiments, the matching module 422 may be configured to match the score value associated with the assigned priority for the work item and the bit-mapped skill value for the work item by accessing the database 408 and/or the server 404. Further, according to exemplary embodiments, the matching module 422 may be configured to match the user's availability data with the availability information received from the database 408 and/or the server 404.

According to exemplary embodiments, the creating module 428 may be configured to create rules for varying attributes found in the one or more source systems. According to exemplary embodiments, for each rule, the aligning module 426 may be configured to automatically align a score value that matches the assigned priority to each work item and the assigning module 424 may be configured to automatically assign each work item to the user computing device based on the aligned score value. According to exemplary embodiments, the user computing device may be the CRED 402 and/or one or more of the administrator devices 309(1)-309(n), but the disclosure is not limited thereto.

According to exemplary embodiments, the creating module 428 may be configured to create rules for varying attributes found in the one or more source systems. According to exemplary embodiments, for each rule, the aligning module 426 may be configured to automatically align a skill set of user (e.g., an engineer who is responsible to resolve the work item) that matches the bit mapped skill value for each work item and the assigning module 424 may be configured to automatically assign each work item to the user computing device based on the aligned skill set. According to exemplary embodiments, the user computing device may be the CRED 402 and/or one or more of the administrator devices 309(1)-309(n), but the disclosure is not limited thereto.

According to exemplary embodiments, the updating module 432 may be configured to dynamically and automatically update the database 408 and/or the server 404 when new skill set data and new availability data are received from the one or more administrator computing devices 309(1)-309(n) (as shown in FIG. 3) to ensure accuracy of skill set data and availability data.

According to exemplary embodiments, the communication module 430 may be configured to automatically send an electronic notification to both the user computing device and the one or more administrator computing devices, different from the user's computing device, after assigning the work item to the user computing device. According to exemplary embodiments, any know electronic notification format may be utilized, i.e., electronic mail (email), SMS (text), etc. According to exemplary embodiments, the user computing device may be the CRED 402 and the administrator computing devices may be the administrator devices 309(1)-309 (n).

According to exemplary embodiments, the storing module 434 may be configured to store the score value associated with the assigned priority for each work item and the bit-mapped skill value for each work item onto the database 408 and/or onto the server 404 via the communication module 430 and the communication network 410. According to exemplary embodiments, the communication module 430 may be further configured to automatically send an electronic notification from the user computing device to both the database 408 and/or the server 404 and to the one or more administrator computing devices 309(1)-309(n) when the work item is completed based on the received input of completion from the CRED 402. According to exemplary embodiments, the updating module 432 may be configured to dynamically and automatically update the database 408 and/or the server 404 by removing the completed work item from a que of work items and the scoring module 416 may be configured to automatically rescore the remaining work items so that the assigning module 424 may assign new priorities to each remaining work item.

According exemplary embodiments, the storing module 434 may be configured to store the score value associated with the assigned priority for each work item and the bit-mapped skill value for each work item onto the database 408 and/or onto the server 404 via the communication module 430 and the communication network 410. According to exemplary embodiments, the scoring module 416 may be configured to automatically rescore each work item when new work items are received from the one or more source systems (e.g., client devices 308(1)-308(n) as illustrated in FIG. 3) and the updating module 432 may be configured to dynamically and automatically update the database 408 and/or the server 404 based on the rescored work items to ensure accuracy of priorities.

According to exemplary embodiments, a non-transitory computer readable medium may be configured to store instructions for implementing the CREM 406 for automatically assigning a work item to a user computing device based on user's skill set and availability. According to exemplary embodiments, the instructions, when executed, may cause a processor embedded within the CREM 406 to perform the following: providing a database that stores data related to skill set of each user received from one or more administrator computing devices and data related to availability information of each user received from one or more scheduling systems; receiving data associated with each of a plurality of work items received from one or more source systems (client devices) via one or more communication networks; dynamically allocating, from the received data, both a score value to assign a priority to each work item and a bit-mapped skill value for each work item regardless of the source system from which each work item is being received or work type of each work item; querying the database to identify one or more users having availability data and associated skill set data correlated with the score value associated with the assigned priority for each work item and the bit-mapped skill value for each work item; and automatically assigning a work item to a user computing device utilized by a user based on identifying that the user's skill set data matches the score value associated with the assigned priority for the work item and the bit-mapped skill value for the work item, and that the user's availability data matches the availability information received from the database via the one or more communication networks. The processor may be the same or similar to the processor 104 as illustrated in FIG. 1 or a processor embedded within the CRED 202 as illustrated in FIG. 2 or a processor embedded within the CREM 406 as illustrated in FIG. 4.

According to exemplary embodiments, the instructions, when executed, may further cause the processor 104 to perform the following: creating rules for varying attributes found in the one or more source systems; for each rule, automatically aligning a score value that matches the assigned priority to each work item; and automatically assigning each work item to the user computing device based on the aligned score value, but the disclosure is not limited thereto.

According to exemplary embodiments, the instructions, when executed, may further cause the processor 104 to perform the following: creating rules for varying attributes found in the one or more source systems; for each rule, automatically aligning a skill set of user (e.g., an engineer who is responsible to resolve the work item) that matches the bit mapped skill value for each work item; and automatically assigning each work item to the user computing device based on the aligned skill set, but the disclosure is not limited thereto.

According to exemplary embodiments, the instructions, when executed, may further cause the processor 104 to dynamically and automatically update the database when new skill set data and new availability data are received from the one or more administrator computing devices to ensure accuracy of skill set data and availability data, but the disclosure is not limited thereto.

According to exemplary embodiments, the instructions, when executed, may further cause the processor 104 to automatically send an electronic notification to both the user computing device and the one or more administrator computing devices, different from the user's computing device, after assigning the work item to the user computing device, but the disclosure is not limited thereto.

According to exemplary embodiments, the instructions, when executed, may further cause the processor 104 to perform the following: storing the score value associated with the assigned priority for each work item and the bit-mapped skill value for each work item onto the database; automatically sending an electronic notification from the user computing device to both the database and the one or more administrator computing devices when the work item is completed; dynamically and automatically updating the database by removing the completed work item from a que of work items; and automatically rescoring the remaining work items to assign new priorities to each remaining work item, but the disclosure is not limited thereto.

According to exemplary embodiments, the instructions, when executed, may further cause the processor 104 to perform the following: storing the score value associated with the assigned priority for each work item and the bit-mapped skill value for each work item onto the database; automatically rescoring each work item when new work items are received from the one or more source systems; and dynamically and automatically updating, the database based on the rescored work items to ensure accuracy of priorities, but the disclosure is not limited thereto.

Figure 5:
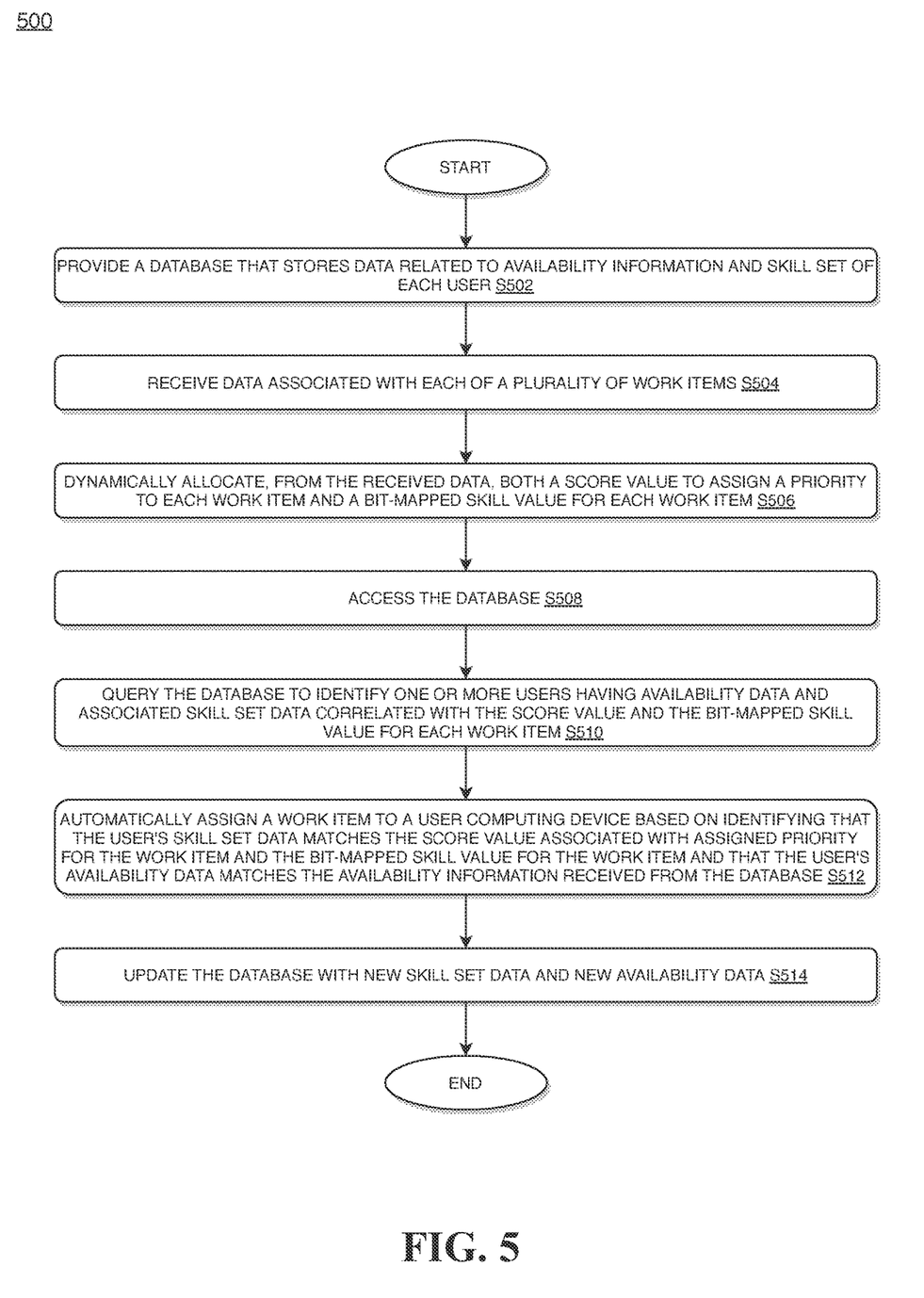
FIG. 5 illustrates a flowchart of an exemplary process for implementing a customizable rules engine module in accordance with an exemplary embodiment.

FIG. 5 illustrates a flowchart of an exemplary process for implementing a customizable rules engine module for automatically assigning a work item to a user computing device based on user's skill set and availability in accordance with an exemplary embodiment. The customizable rules engine module may be the CREM 306 as illustrated in FIG. 3 or the CREM 406 as illustrated in FIG. 4.

In the process 500 of FIG. 5, a database may be provided at step S502. The database may store data related to skill set of each user received from one or more administrator computing devices and data related to availability information of each user received from one or more scheduling systems.

At step S504, data associated with each of a plurality of work items received from one or more source systems (client devices) may be received via one or more communication networks.

At step S506, both a score value to assign a priority to each work item and a bit-mapped skill value for each work item may be dynamically allocated from the received data. According to exemplary embodiments, both the score value and the bit-mapped skill value for each work item may be assigned regardless of the source system from which each work item is being received or work type of each work item.

At step S508, the database may be accessed by an access module. According to exemplary embodiments, the access module may be the same or similar to the access module 418 as illustrated in FIG. 4.

At step S510, the database by be queried to identify one or more users having availability data and associated skill set data correlated with the score value associated with the assigned priority for each work item and the bit-mapped skill value for each work item.

At step S512, a work item may be automatically assigned to a user computing device utilized by a user based on identifying that the user's skill set data matches the score value associated with the assigned priority for the work item and the bit-mapped skill value for the work item, and that the user's availability data matches the availability information received from the database via the one or more communication networks.

According to exemplary embodiments, the process 500 may further include: creating rules for varying attributes found in the one or more source systems; for each rule, automatically aligning a score value that matches the assigned priority to each work item; and automatically assigning each work item to the user computing device based on the aligned score value, but the disclosure is not limited thereto.

According to exemplary embodiments, the process 500 may further include: creating rules for varying attributes found in the one or more source systems; for each rule, automatically aligning a skill set of user (e.g., an engineer who is responsible to resolve the work item) that matches the bit mapped skill value for each work item; and automatically assigning each work item to the user computing device based on the aligned skill set, but the disclosure is not limited thereto.

According to exemplary embodiments, the process 500 may further include: dynamically and automatically updating the database when new skill set data and new availability data are received from the one or more administrator computing devices to ensure accuracy of skill set data and availability data, but the disclosure is not limited thereto.

According to exemplary embodiments, the process 500 may further include: automatically sending an electronic notification to both the user computing device and the one or more administrator computing devices, different from the user's computing device, after assigning the work item to the user computing device, but the disclosure is not limited thereto.

According to exemplary embodiments, the process 500 may further include: storing the score value associated with the assigned priority for each work item and the bit-mapped skill value for each work item onto the database; automatically sending an electronic notification from the user computing device to both the database and the one or more administrator computing devices when the work item is completed; dynamically and automatically updating the database by removing the completed work item from a que of work items; and automatically rescoring the remaining work items to assign new priorities to each remaining work item, but the disclosure is not limited thereto.

According to exemplary embodiments, the process 500 may further include: storing the score value associated with the assigned priority for each work item and the bit-mapped skill value for each work item onto the database; automatically rescoring each work item when new work items are received from the one or more source systems; and dynamically and automatically updating, the database based on the rescored work items to ensure accuracy of priorities, but the disclosure is not limited thereto.

According to exemplary embodiments as disclosed above in FIGS. 1-5, technical improvements effected by the instant disclosure may include platforms for implementing a customizable rules engine module for dynamically and automatically allocating both a score value and a bit-mapped skill value for every received work item regardless of source system or work type, thereby significantly reducing processing time and resolution time of each work item, but the disclosure is not limited thereto. The various aspects, embodiments, features, and/or sub-components disclosed herein with respect to FIGS. 1-5 may also provide optimized processes of implementing a customizable rules engine module that may allow automatically creating rules for varying attributes found in various source systems (e.g., an alert identification or a region of the requesting user), and for each rule, aligning a score (which may result in it being prioritized higher) or a skill set (which a person may be allocated in order to work that item), but the disclosure is not limited thereto. The various aspects, embodiments, features, and/or sub-components disclosed herein with respect to FIGS. 1-5 may also provide optimized processes of implementing a customizable rules engine module that may allow, for each work item (e.g., ticket, request, task, etc.), automatically rescoring whenever updated, and at periodic intervals, to ensure that the priority is always accurate, but the disclosure is not limited thereto. The various aspects, embodiments, features, and/or sub-components disclosed herein with respect to FIGS. 1-5 may also provide optimized processes of implementing a customizable rules engine module that may allow utilizing a bit-mapping approach for skill sets allowing multiple rule matches to dictate an engineer should possess skill set X, Y and/or Z, etc. in order to take the work item, but the disclosure is not limited thereto. The various aspects, embodiments, features, and/or sub-components disclosed herein with respect to FIGS. 1-5 may also provide optimized processes of implementing a customizable rules engine module that may allow utilizing the output from the customizable rules engine module to dynamically and automatically assign work items to the most appropriate user (e.g., an engineer) at any time based on the user's availability and skill set.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for automatically assigning a work item to a user computing device based on a skill set and an availability of a user, the method comprising:
   implementing a customizable rules engine module (CREM) that includes a receiving module, an allocating module, a querying module, and an assigning module, wherein each module being called via a corresponding Application Programming Interface (API), and wherein the CREM is configured to dynamically and automatically allocate both a score and a bit-mapped skill value for a received work item regardless of source system or work type by utilizing each of said modules by calling the corresponding API;
   providing a database that stores skill set data related to a skill set of one or more users received from one or more administrator computing devices and availability data related to an availability information of said one or more users received from one or more scheduling systems;
   receiving, by a receiver utilizing the receiving module, data associated with each of a plurality of work items received from said one or more source systems via one or more communication networks;
   dynamically allocating, by a processor utilizing the allocating module, from the received data, both the score value to assign a priority to each work item and the bit-mapped skill value for each work item regardless of the source system from which each work item is being received or work type of each work item;
   querying the database, by the processor utilizing the querying module, to identify one or more users having availability data and associated skill set data correlated with the score value associated with the assigned priority for each work item and the bit-mapped skill value for each work item; and
   automatically assigning, by the processor utilizing the assigning module, the work item to a user computing device utilized by a user based on identifying that the user's skill set data matches the score value associated with the assigned priority for the work item and the bit-mapped skill value for the work item, and that the user's availability data matches the availability information received from the database via the one or more communication networks.

2. The method according to claim 1, further comprising:
   creating rules, by the processor, for varying attributes found in the one or more source systems;
   for each rule, automatically aligning, by the processor, a score value that matches the assigned priority to each work item; and
   automatically assigning, by the processor, each work item to the user computing device based on the aligned score value.

3. The method according to claim 1, further comprising:
   creating rules, by the processor, for varying attributes found in the one or more source systems;
   for each rule, automatically aligning, by the processor, a skill set of a user that matches the bit-mapped skill value for each work item; and
   automatically assigning, by the processor, each work item to the user computing device based on the aligned skill set.

4. The method according to claim 1, further comprising:
   dynamically and automatically updating, by the processor, the database when new skill set data and new availability data are received from the one or more administrator computing devices to ensure accuracy of skill set data and availability data.

5. The method according to claim 1, further comprising:
   automatically sending, by the processor, an electronic notification to both the user computing device and the one or more administrator computing devices, different from the user's computing device, after assigning the work item to the user computing device.

6. The method according to claim 1, further comprising:
   storing, by the processor, the score value associated with the assigned priority for each work item and the bit-mapped skill value for each work item onto the database;
   automatically sending, by the processor, an electronic notification from the user computing device to both the database and the one or more administrator computing devices when the work item is completed;
   dynamically and automatically updating, by the processor, the database by removing the completed work item from a que of work items; and
   automatically rescoring, by the processor, the remaining work items to assign new priorities to each remaining work item.

7. The method according to claim 1, further comprising:
  storing, by the processor, the score value associated with the assigned priority for each work item and the bit-mapped skill value for each work item onto the database;
  automatically rescoring, by the processor, each work item when new work items are received from the one or more source systems; and
  dynamically and automatically updating, by the processor, the database based on the rescored work items to ensure accuracy of priorities.

8. A system for automatically assigning a work item to a user computing device based on a skill set and an availability of a user, the system comprising:
  a database that stores skill set data related to a skill set of one or more users received from one or more administrator computing devices and availability data related to an availability information of said one or more users received from one or more scheduling systems;
  a receiver that receives data associated with each of a plurality of work items received from one or more source systems via one or more communication networks; and
  a processor operatively connected to the database and the receiver via the one or more communication networks, wherein the processor is configured to:
  implement a customizable rules engine module (CREM) that includes an allocating module, a querying module, and an assigning module, wherein each module being called via a corresponding Application Programming Interface (API), and wherein the CREM is configured to dynamically and automatically allocate both a score and a bit-mapped skill value for a received work item received by the receiver regardless of source system or work type by utilizing each of said modules by calling the corresponding API;
  dynamically allocate, by utilizing the allocating module, from the received data, both the score value to assign a priority to each work item and the bit-mapped skill value for each work item regardless of the source system from which each work item is being received or work type of each work item;
  query the database, by utilizing the querying module, to identify one or more users having availability data and associated skill set data correlated with the score value associated with the assigned priority for each work item and the bit-mapped skill value for each work item; and
  automatically assign, by utilizing the assigning module, the work item to a user computing device utilized by a user based on identifying that the user's skill set data matches the score value associated with the assigned priority for the work item and the bit-mapped skill value for the work item, and that the user's availability data matches the availability information received from the database via the one or more communication networks.

9. The system according to claim 8, wherein the processor is further configured to:
  create rules for varying attributes found in the one or more source systems;
  for each rule, automatically align a score value that matches the assigned priority to each work item; and
  automatically assign each work item to the user computing device based on the aligned score value.

10. The system according to claim 8, wherein the processor is further configured to:
  create rules for varying attributes found in the one or more source systems;
  for each rule, automatically align, by the processor, a skill set of a user that matches the bit-mapped skill value for each work item; and
  automatically assign each work item to the user computing device based on the aligned skill set.

11. The system according to claim 8, wherein the processor is further configured to:
  dynamically and automatically update the database when new skill set data and new availability data are received from the one or more administrator computing devices to ensure accuracy of skill set data and availability data.

12. The system according to claim 8, wherein the processor is further configured to:
  automatically send an electronic notification to both the user computing device and the one or more administrator computing devices, different from the user's computing device, after assigning the work item to the user computing device.

13. The system according to claim 8, wherein the processor is further configured to:
  store the score value associated with the assigned priority for each work item and the bit-mapped skill value for each work item onto the database;
  automatically send, by the processor, an electronic notification from the user computing device to both the database and the one or more administrator computing devices when the work item is completed;
  dynamically and automatically update the database by removing the completed work item from a que of work items; and
  automatically rescore the remaining work items to assign new priorities to each remaining work item.

14. The system according to claim 8, wherein the processor is further configured to:
  store the score value associated with the assigned priority for each work item and the bit-mapped skill value for each work item onto the database;
  automatically rescore each work item when new work items are received from the one or more source systems; and
  dynamically and automatically update the database based on the rescored work items to ensure accuracy of priorities.

15. A non-transitory computer readable medium configured to store instructions for automatically assigning a work item to a user computing device based on a skill set and an availability of a user, wherein, when executed, the instructions cause a processor to perform the following:
  configuring a database to store skill set data related to a skill set of one or more users received from one or more administrator computing devices and availability data related to an availability information of said one or more users received from one or more scheduling systems;
  implementing a customizable rules engine module (CREM) that includes a receiving module, an allocating module, a querying module, and an assigning module, wherein module each being called via a corresponding Application Programming Interface (API), and wherein the CREM is configured to dynamically and automatically allocating both a score and a bit-mapped skill value for a received work item regardless of source system or work type by utilizing each of said modules by calling the corresponding API;

receiving, by utilizing the receiving module, data associated with each of a plurality of work items received from said one or more source systems via one or more communication networks;

dynamically allocating, by utilizing the allocating module, from the received data, both the score value to assign a priority to each work item and the bit-mapped skill value for each work item regardless of the source system from which each work item is being received or work type of each work item;

querying the database, by utilizing the querying module, to identify one or more users having availability data and associated skill set data correlated with the score value associated with the assigned priority for each work item and the bit-mapped skill value for each work item; and automatically assigning, by utilizing the assigning module, the work item to a user computing device utilized by a user based on identifying that the user's skill set data matches the score value associated with the assigned priority for the work item and the bit-mapped skill value for the work item, and that the user's availability data matches the availability information received from the database via the one or more communication networks.

16. The non-transitory computer readable medium according to claim 15, wherein, when executed, the instructions further cause the processor to perform the following:

creating rules for varying attributes found in the one or more source systems;

for each rule, automatically aligning a score value that matches the assigned priority to each work item; and automatically assigning each work item to the user computing device based on the aligned score value.

17. The non-transitory computer readable medium according to claim 15, wherein, when executed, the instructions further cause the processor to perform the following:

creating rules for varying attributes found in the one or more source systems;

for each rule, automatically aligning a skill set of a user that matches the bit-mapped skill value for each work item; and automatically assigning each work item to the user computing device based on the aligned skill set.

18. The non-transitory computer readable medium according to claim 15, wherein, when executed, the instructions further cause the processor to perform the following:

dynamically and automatically updating the database when new skill set data and new availability data are received from the one or more administrator computing devices to ensure accuracy of skill set data and availability data.

19. The non-transitory computer readable medium according to claim 15, wherein, when executed, the instructions further cause the processor to perform the following:

automatically sending an electronic notification to both the user computing device and the one or more administrator computing devices, different from the user's computing device, after assigning the work item to the user computing device.

20. The non-transitory computer readable medium according to claim 15, wherein, when executed, the instructions further cause the processor to perform the following:

storing the score value associated with the assigned priority for each work item and the bit-mapped skill value for each work item onto the database;

automatically sending an electronic notification from the user computing device to both the database and the one or more administrator computing devices when the work item is completed;

dynamically and automatically updating the database by removing the completed work item from a que of work items; and automatically rescoring the remaining work items to assign new priorities to each remaining work item.

* * * * *